United States Patent [19]

White

[11] 4,049,613

[45] Sept. 20, 1977

[54] POLYETHERIMIDE COMPOSITES

[75] Inventor: Dwain M. White, Schenectady, N.Y.

[73] Assignee: General Electric Company, Schenectady, N.Y.

[21] Appl. No.: 720,583

[22] Filed: Sept. 7, 1976

[51] Int. Cl.$^2$ .............................................. C08L 79/08
[52] U.S. Cl. ........................ 260/37 N; 260/DIG. 23
[58] Field of Search ......................... 260/37 N, 47 CP

[56] References Cited

U.S. PATENT DOCUMENTS

| | | | |
|---|---|---|---|
| 3,660,140 | 5/1972 | Scola et al. ........................ | 260/37 N |
| 3,723,607 | 3/1973 | Kalnin ................................ | 260/37 N |
| 3,847,867 | 11/1974 | Heath et al. ........................ | 260/37 N |
| 3,983,093 | 9/1976 | Williams et al. ................... | 260/37 N |
| 3,991,004 | 11/1976 | Takekoshi et al. ................ | 260/37 N |

*Primary Examiner*—Lewis T. Jacobs
*Attorney, Agent, or Firm*—William A. Teoli; Joseph T. Cohen; Jerome C. Squillaro

[57] ABSTRACT

Carbon fiber-polyetherimide matrix composites are provided, based on the use of polyetherimide having terminal nitro groups. The carbon fiber-polyetherimide composites have high strength, high modulus and superior solvent resistance.

4 Claims, No Drawings

POLYETHERIMIDE COMPOSITES

The present invention relates to polyetherimide-carbon fiber composites and method for making such materials. More particularly, the present invention relates to the treatment of carbon fibers with polyetherimide having terminal nitro groups followed by the molding of such treated carbon fibers to produce shaped polyetherimide composites renforced with carbon fiber.

Prior to the present invention, as shown by U.S. Patents to Wirth et al 3,838,097 and Takekoshi et al No. 3,803,085, both patents being assigned to the same assignee as the present invention, polyetherimides consisting essentially of chemically combined units of the formula,

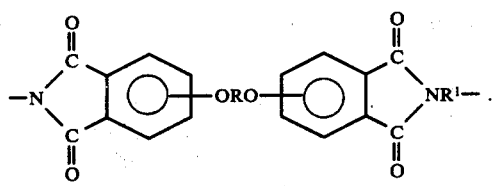

were made by either a nitrodisplacement reaction involving a nitro-terminated bisimide and a dihydric phenol salt or a melt polymerization reaction, based on the use of an organic dianhydride and organic diamine, where R is

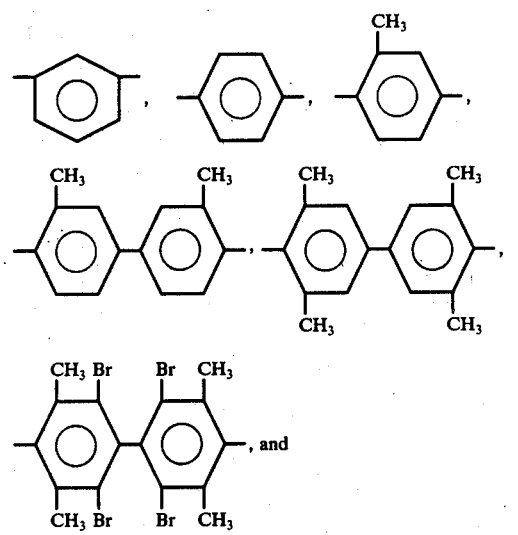

and (b) divalent organic radicals of the general formula

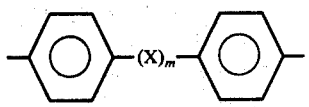

where X is a member selected from the class consisting of divalent radicals of the formulas, $-C_yH_{2y}-$,

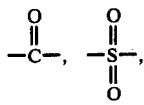

$-O-$, and $-S-$, where $m$ is 0 or 1, $y$ is a whole number from 1-5, and $R^1$ is a monovalent organo radical selected from the class consisting of $C_{(1-8)}$ alkyl radicals, and organic radicals having from 6-20 carbon atoms, selected from the class consisting of aromatic hydrocarbon radicals and halogenated derivatives thereof.

As taught by Wirth et al, the polyetherimide, consisting essentially of chemically combined units of formula (1), are high impact injection moldable thermoplastics. As taught in U.S. pat. No. 3,803,085, the polyetherimides can be reinforced with various materials, such as glass fibers, silica fillers, carbon whiskers, etc. In Lubowitz U.S. Pat. No. 3,699,075, directed to polyetherimides, based on the use of bis(3,4-dicarboxy phenoxy)-sulfone, various reinforcing fillers can be used, for example, the fibers and powders of carbon, to produce molded articles or laminate structures.

As taught by Lubowitz, although the polyetherimides can be used to make high performance reinforced composites, the completely imidized polymer may be redissolved in various polar solvents. As a result, many of the desirable properties of polyetherimides, such as ease of fabrication into high performance materials, cannot be employed in particular applications where solvent resistance is required.

The present invention is based on the discovery that polyetherimides made in accordance with Wirth et al U.S. Pat. No. 3,838,097 can be used to make solvent resistant high performance carbon fiber reinforced composites. Although the reason why the polyetherimides of Wirth et al U.S. Pat. No. 3,838,097 can be used to make solvent resistant composites, in addition to being a high performance material is not completely understood, one possible explanation is that interaction occurs between the nitro groups of the polyetherimide and the carbon fibers, particularly if the carbon fibers have been surface oxidized with an oxidizing agent, such as nitric acid.

In accordance with the present invention, polyetherimide-carbon fiber composites are provided comprising
A. from 40 % to 85 % by weight of carbon fiber having a tensile strength of at least 100,000 psi at 25° C and an elastic modulus of at least $2 \times 10^6$ psi at 25° C, and
B. from 15 % to 60 % by weight of polyetherimide consisting essentially of chemically combined units of formula (1) and having terminal nitro aromatic groups.

The polyetherimides, consisting essentially of units of formula (1), can be made by the procedure shown by White et al, U.S. Pat. No. 3,855,178, assigned to the same assignee as the present invention. A dinitro-bisimide of the formula,

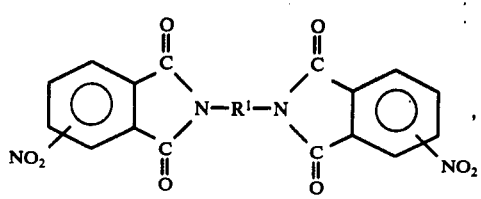

(2)

and an alkali salt of the formula, $$M—R—OM,$$ (3)

where R and R¹ are as previously defined and M is an alkali metal ion such as sodium, potassium, lithium, etc., can be employed at substantially equal molar amounts in the presence of an organic solvent, such as a dipolar aprotic organic solvent, or mixtures of such solvents with non-polar solvents such as benzene, toluene, etc.

Included by the dinitro-bisimides of formula (2) are, for example, bis(3-nitrophthalimido)diphenyl methane, bis(4- nitrophthalimido)diphenyl methane, bis(3-nitrophthalimido) diphenyl ether, bis(4-nitrophthalimido)diphenyl ether, etc. These compounds can be made by effecting reaction between about 2 moles of a nitrophthalic anhydride, such as 3 or 4-nitrophthalic anhydride, per mole of an organic diamine of the formula $$NH_2R^1NH_2,$$ (4)

where R¹ is as previously defined. For example, a glacial acetic acid solution of either 3- or 4-nitrophthalic anhydride or a mixture thereof can be prepared using 5–10 parts of solvent per part of nitrophthalic anhydride. The organic diamine can be slowly added with stirring to the solution to produce a suspension of 2 moles of anhydride per mole of organic diamine. The suspension is refluxed for 2–12 hours. On cooling, the dinitro-bisimide crystallizes from solution and is collected on a filter and washed with glacial acetic acid. the produce is dried in vacuo. The anhydrous material may be recrystallized from an appropriate solvent and redried, but it is often sufficiently pure for polymerizations without purification.

Included by the organic diamines of formula 4 are, for example,
m-phenylenediamine;
p-phenylenediamine;
4,4'-diaminodiphenylpropane;
4,4'-diaminodiphenylmethane; benzidine;
4,4'-diaminodiphenyl sulfide;
4,4'-diaminodiphenyl sulfone;
4,4'-diaminodiphenyl ether;
1,5-diaminonaphthalene;
3,3'-dimethylbenzidine;
3,3'-dimethoxybenzidine;
2,4-bis( β-amino-t-butyl)toluene;
bis(p-β-amino-t-butylphenyl)ether;
bis(p-β-methyl-o-aminopentyl)benzene;
1,3-diamino-4-isopropylbenzene;
1,2-bis(3-aminopropoxy)ethane;
m-xylylenediamine;
p-xylylenediamine;
2,4-diaminotoluene;
2,6-diaminotoluene;
bis(4-aminocyclohexyl)methane;
3-methylheptamethylenediamine;
4,4-dimethylheptamethylenediamine;
2,11-dodecanediamine;
2,2-dimethylpropylenediamine;
octamethylenediamine;
3-methoxyhexamethylenediamine;
2,5-dimethylhexamethylenediamine;
2,5-dimethylheptamethylenediamine;
3-methylheptamethylenediamine;
5-methylnonamethylenediamine;
1,4-cyclohexanediamine;
1,12-octadecanediamine;
bis(3-aminopropyl)sulfide;
N-methyl-bis(3-aminopropyl)amine;
hexamethylenediamine;
heptamethylenediamine;
nonamethylenediamine;
decamethylenediamine;
2,6-diaminotoluene;
bis(3-aminopropyl)teramethyldisiloxane;
bis(4-aminobutyl)teramethyldisoloxane; etc.

The alkali diphenoxides of formula (3) are well known and include, for example, the disodium salt of 2,2bis(4- hydroxyphenyl)propane, the disodium salt of 4,4'-dihydroxybiphenyl, the disodium salt of 4,4'-dihydroxydiphenyl sulfone, the dipotassium salt of 4,4'-dihydroxydiphenyl sulfide, etc. These alkali metal diphenoxides can be made by effecting reaction between an alkali metal hydroxide and a dihydric phenol. For example, the alkali metal salt of bisphenol-A can be obtained by reacting 2 moles of sodium hydroxide per mole of bisphenol-A. Again, alkali metal diphenoxides also can be made by adding 0.58 part of fresh cut of sodium metal to 75 parts of anhydrous methanol, with a magnetic stirrer under a nitrogen atmosphere. There is added to the mixture at the termination of the sodium reaction, 2,875 parts of bis- phenol-A followed by evaporating the resulting solution to dryness. There is obtained a white solid upon drying the mixture further at 70° C.

Dihydric phenols which can be used to make the alkali metal diphenoxides of formula (3) are, for example,
2,2-bis(2-hydroxyphenyl)propane;
2,4'-dihydroxydiphenylmethane;
bis(2-hydroxyphenyl)methane;
2,2-bis(4-hydroxyphenyl)propane, hereinafter identified as "bisphenol-A" or "BPA";
1,1-bis(4-hydroxyphenyl)ethane;
1,1-bis(4-hydroxyphenyl)propane;
2,2-bis(4-hydroxyphenyl)pentane;
3,3-bis(4-hydroxyphenyl)pentane;
4,4'-dihydroxybiphenyl;
4,4'-dihydroxy-3,3', 5,5'-tetramethylbiphenyl;
2,4'-dihydroxybenzophenone;
4,4'-dihydroxydiphenyl sulfone;
2,4'-dihydroxydiphenyl sulfone;
4,4'-dihydroxydiphenyl sulfoxide;
4,4'-dihydroxydiphenyl sulfide;
hydroquinone;
resorcinol;
3,4'-dihydroxydiphenylmethane;
4,4'-dihydroxybenzophenone;
and 4,4'-dihydroxydiphenyl ether.

Included by the carbon fibers which can be used to make the composites of the present invention are carbon fibers, or graphite fibers having a tensile strength of at least 100,000 psi and a modulus of at least $2 \times 10^6$ psi. Examples of such carbon fibers are materials derived from carbonized polyacrylonitrile, cellulose acetate, cellulose nitrate, etc., such as Moganite Type I and II, Thornel 25, 40, 50, etc., fibers made from molten polyvinyl chloride pitch, etc., Modmor I, etc.

In the practice of the invention, the carbon fiber in the form of tows are treated with polyetherimide. The treated fibers can then be cut to a specific shape if desired and thereafter molded to produce the polyetherimide composite.

It has been found desirable to pretreat the carbon fiber prior to contact with polyetherimide with an oxidizing agent, such as nitric acid, to improve adhesion of the polyetherimide matrix to the fiber. For example, the carbon fiber can be contacted with refluxing nitric acid or vapors for several hours if desired. Fibers can then be washed with water and dried.

An effective procedure for treating the carbon fiber with the polyetherimide is to employ a solution of the polyetherimide in a suitable organic solution in chloroform. The treated carbon fiber can then be allowed to dry. Depending on the shape of the composite desired, the fibers can be cut to size to a suitable length. Molding of the treated carbon fiber can be achieved at temperatures in the range of from 250° C to 350° C and a pressure of from 1000psi to 10,000 psi.

Although it is preferred to use carbon fibers as a reinforcing filler, other materials can be used, such as boron fibers, boron nitride fibers, glass fibers, aluminum fibers, steel fibers, alumina fibers, carbon whiskers, mica, asbestos, sand, etc.

In order that those skilled in the art may be better able to practice the invention, the following example is given by way of illustration and not by way of limitation. All parts are by weight.

EXAMPLE 1

Carbon fiber tows (Modmor 1) in 40 inch lengths were exposed to refluxing nitric acid (60%) vapors for 3 days. Then washed in water and dried. The tows were pulled at constant speed (0.3 cm/sec) through a 15% by weight chloroform solution of polyetherimide having a viscosity of 0.3 dl/g and dimethylformamide at 25° C. The polyetherimide was made by the following procedure.

Freshly cut pieces of sodium metal (0.9160g) were dissolved in 50 ml anhydrous methanol under a nitrogen atmosphere in a pre-flamed flask. The diphenol of 2,2-isopropylidene (4.55g) was added to the solution and the solution was evaporated to dryness on a rotary evaporator. The white solid was dried further at 100° C at 0.1 torr for one hour. The flask and contents were cooled to 25° C and charged with 30 ml anhydrous dimethyl sulfoxide, 30 ml anhydrous toluene and 11.0 g of 3,3'-dinitro-bis-imide (2), where R¹ is

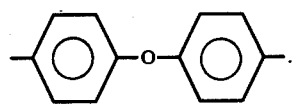

After stirring at 40° C for 17 hours under nitrogen, the reaction mixture was added dropwise to 1200 ml of methanol. The precipitated polymer was dissolved in 100 ml chloroform, 1.0 ml acetic acid was added and the solution was added dropwise to 1 ml of methanol. Filtration and drying at 80° C afforded polyetherimide with an intrinsic viscosity (in DMF at 25° C) of 0.33 dl/g and is referred to below as "Nitro-A".

A second polyetherimide was prepared in an analogous manner with 3,3'-dinitrobisimide (2) where R¹ is

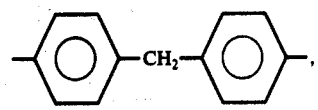

and is referred to below as "Nitro-B".

The above polyetherimide treated carbon fibers was allowed to dry at 25° C for 15 minutes, then at 110° C for 15 minutes. The tow was cut into 2.5 inch lengths and these were aligned uniaxially in a 2.5 inch by 0.375 inch mold. After 5 minutes at 300° C and pressure of 2000 psi, the sample was removed.

The above procedure was repeated, except that in place of the polyetherimide made by the nitrodisplacement method of Wirth et al, U.S. Pat. No. 3,838,097, a polyetherimide was made by the melt polymerization method in accordance with U.S. Pat. No. 3,803,085. There was employed 2,2-bis[4-(2,3-dicarboxy- phenoxy)phenyl]propane dianhydride and meta phenylene diamine.

The respective composites made by the method of the present invention "Nitro A and B" and the procedure utilizing polyetherimide made by the melt polymerization method "Melt" were then evaluated for flexural strength "FS", flexural modulus "FM" and interlaminar sheer stress "ISS". In addition, the nitro and melt composites were also evaluated for solvent resistance by determining whether the polyetherimide matrix could be extracted from the composites by heating them in boiling chloroform for 5 hours. The following results were obtained, where "SR" (solvent resistance in chloroform) is expressed in weight percent resin extracted:

| Polyetherimide | Wt% Resin | FS (psi ×10⁻³) | FM (psi ×10⁻⁶) | ISS (psi) | SR (% of Total Resin) |
|---|---|---|---|---|---|
| Nitro-A | 21 | 119 | 28 | 5600 | 0 |
| " | 27 | 107 | 28 | 6000 | 0 |
| " | 28 | 107 | 31 | 5300 | 0 |
| " | 32 | 100 | 28 | 4600 | 0 |
| Nitro-B | 19 | 106 | 31 | 3700 | 0 |
| " | 26 | 90 | 27 | 3800 | 0 |
| Melt | 33 | 100 | 28 | 4500 | 50 |

The above results show that the composites made in accordance with the present invention, based on the use of nitro-terminated polyetherimide, provides substantially the same high strength and high modulus characteristics as the composites made by using polyetherimide made under melt polymerization conditions. However, the composites of the present invention also exhibit superior solvent resistance rendering them unexpectedly better than other carbon fiber composites of the prior art.

Although the above example is limited to only few of the very many variables which can be used to illustrate the practice of the present invention, it shold be understood that the present invention is directed to a much broader class of polyetherimide composites, based on the use of polyetherimides and carbon fibers broadly defined in the description preceding these examples.

What I claim as new and desire to secure by Letters Patent of the United States is:

1. Polyetherimie-carbon fiber composites comprising,

A. from 40% to 85% by weight of carbon fiber having a tensile strength of at least 100,000psi at 25° C, and an elastic modulus of at least $2 \times 10^6$ psi at 25° C and, B. from 15% to 60% by weight of polyetherimide, having terminal nitro aromatic groups, consisting essentially of chemically combined units of the formula,

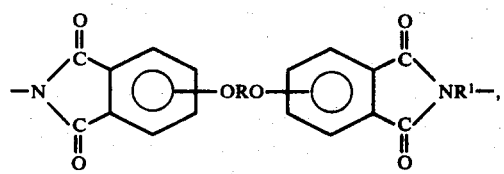

where R is selected from the class consisting of,

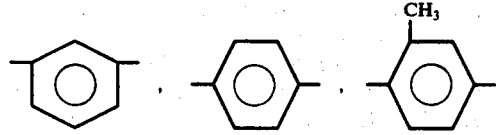

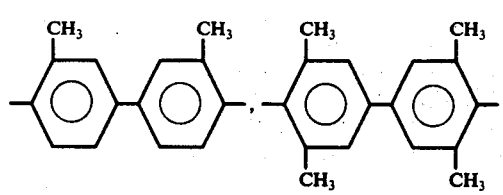

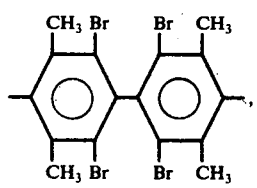

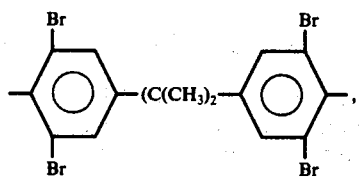

and (b) divalent organic radicals of the general formula,

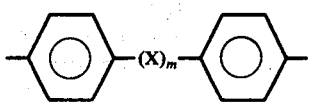

where X is a member selected from the class consisting of divalent radicals of the formulas, $C_nH_{2n}$—,

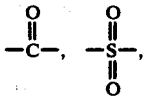

—O—, and —S—, where m is 0 or 1, y is a whole number from 1-5, and $R^1$ is a monovalent organo radical selecred from the class consistng of $C_{(1-8)}$ alkyl radicals, and organic radicals having from 6-20 carbon atoms, selected from the class consisting of aromatic hydrocarbon radicals and halogenated derivatives thereof.

2. A polyetherimide composite in accordance with claim 1, where R is

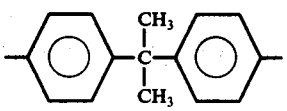

and $R^1$ is

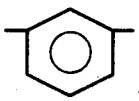

3. A polyetherimide composite in accordance with claim 1, where the carbon fiber is graphite fiber.

4. A method for making a polyetherimide composite which comprises
1. treating a carbon fiber with polyetherimide, consisting essentially of chemically combined units of the formula,

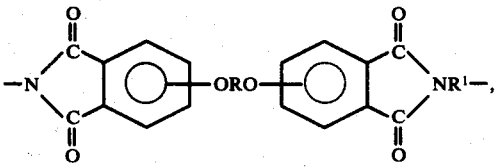

and having terminal nitro groups and
2. molding the resulting treated carbon fiber to a desired shape, where R and $R^1$ are as defined in claim 1.

* * * * *